May 27, 1924.
J. P. HOGELUCHT
1,495,590
ICE CREAM BRICK CUTTER
Filed April 30, 1921   2 Sheets-Sheet 1
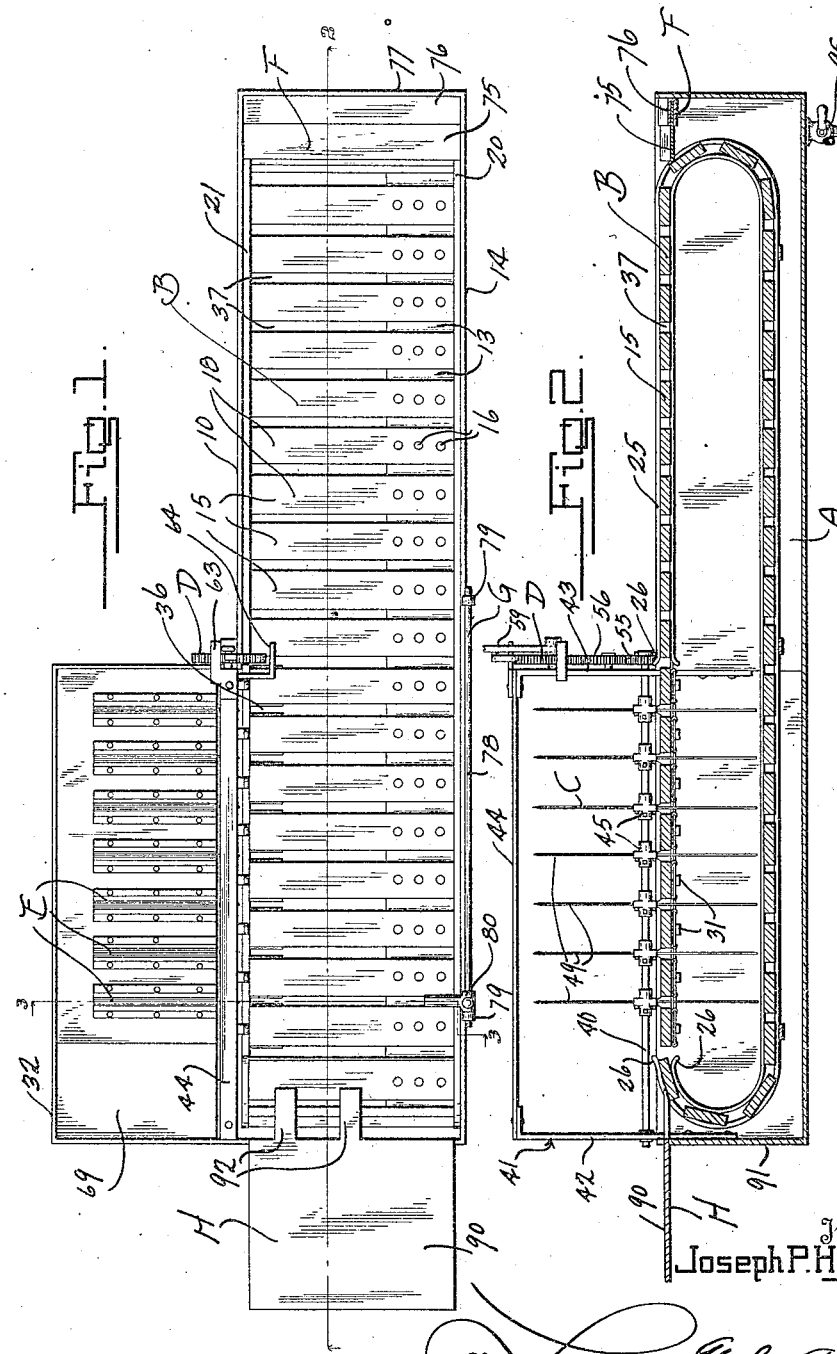
Inventor
Joseph P. Hogelucht
By Lancaster and Allwine
Attorneys May 27, 1924.
J. P. HOGELUCHT
1,495,590
ICE CREAM BRICK CUTTER
Filed April 30, 1921
2 Sheets-Sheet 2
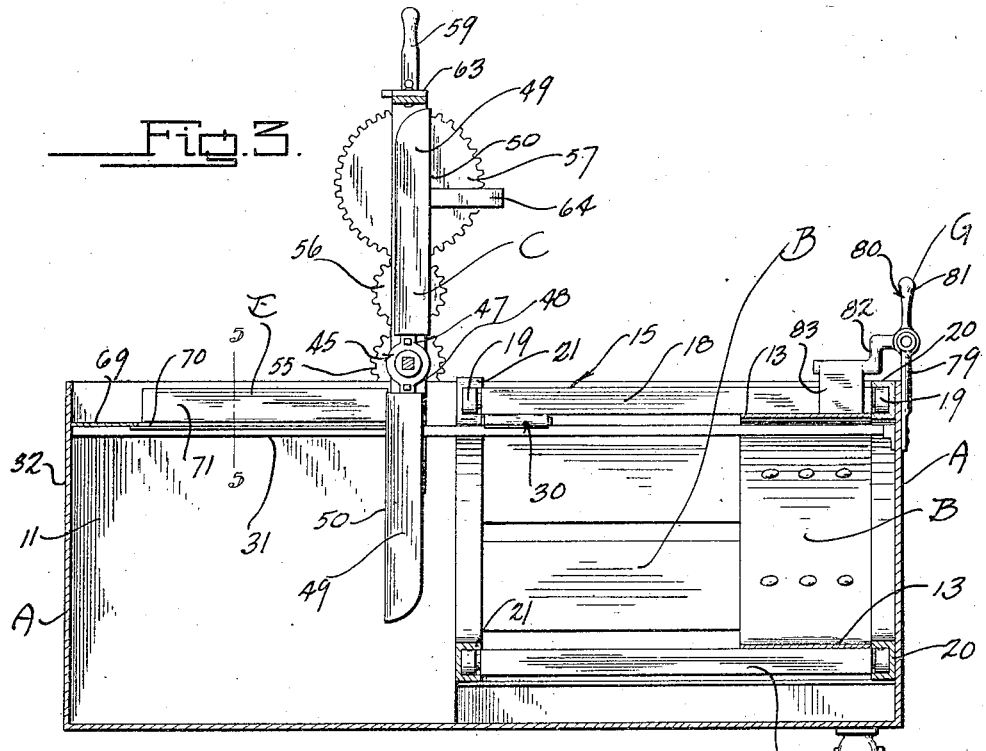
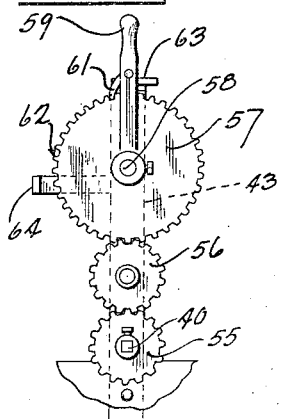
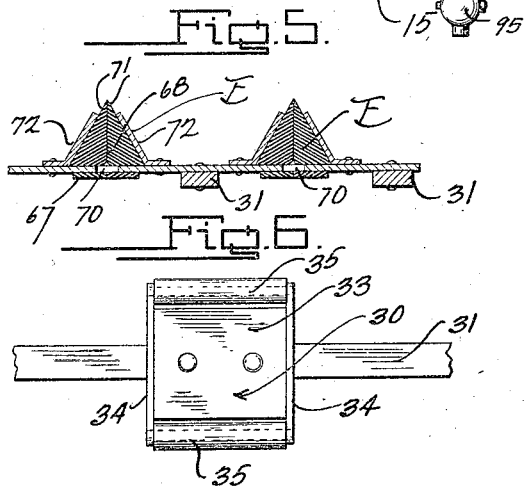
Inventor
Joseph P. Hogelucht.
By Lancaster and Allwein
Attorneys Patented May 27, 1924.

1,495,590

UNITED STATES PATENT OFFICE.

JOSEPH PABRECK HOGELUCHT, OF CINCINNATI, OHIO.

ICE-CREAM-BRICK CUTTER.

Application filed April 30, 1921. Serial No. 465,783.

*To all whom it may concern:*

Be it known that I, JOSEPH P. HOGELUCHT, a citizen of the United States, residing at Cincinnati, in the county of Hamilton and State of Ohio, have invented certain new and useful Improvements in Ice-Cream-Brick Cutters, of which the following is a specification.

This invention relates to an improved machine for cutting materials, such as ice cream, into small subdivisions.

An important object of the invention is the provision of an ice cream brick cutting machine, which will simultaneously cut a plurality of bricks in even and exact proportions.

A further object of the invention is the provision of an ice cream brick cutting machine of the above described character, which will automatically cleanse the cutting means carried thereby, as well as clamp the ice cream supporting means after each operation, thus providing a sanitary and desirable arrangement.

Further objects of the invention are the provision of an ice cream brick cutting machine, which is simple in construction; rapid in operation; and one in which the various parts are detachably assembled in practical manner for accessibility.

Other objects and advantages will be apparent during the course of the following detailed description.

In the accompanying drawings, forming a part of this specification, and in which similar reference characters designate corresponding parts throughout the several views, Figure 1 is a plan view of the improved ice cream brick cutting machine.

Figure 2 is a cross sectional view taken on the line 2—2 of Figure 1.

Figure 3 is a transverse cross sectional view taken through the improved ice cream brick cutting machine, on the line 3—3 of Figure 1.

Figure 4 is an end view of an operating attachment used in connection with the improved ice cream brick cutting machine.

Figure 5 is a fragmentary cross sectional view taken on the line 5—5 of Figure 1.

Figure 6 is a fragmentary plan elevation of a detail of the improved machine.

In the drawings, wherein for the purpose of illustration is shown the preferred embodiment of my invention, the letter A designates a supporting casing having an endless conveyor B detachably assembled therein for rotation. A rotary cutter means C, operable by an attachment D, is provided in the casing A for cooperation with the endless conveyor B, to cut ice cream bricks. Suitable wiping means E is provided in connection with the improved machine for cleansing the cutting means C; wiping means F being provided in the casing A for similarly cleansing the endless conveyor B. A spacing means G is provided for assembly to the casing A, to provide effective means of moving the conveyor A a predetermined distance, to cooperate with the cutting means C. A receiving means H is provided for cooperation with the conveyor means to receive the ice cream bricks as they are cut thereon.

The casing A is preferably of galvanized iron and in the form of a container, comprising a relatively long conveyor chamber 10, and a side chamber 11 for receiving the cutting means C and the improved wiping arrangement E.

The conveyor means B may be in various formations, however, the same preferably comprises a flexible brass belt 13, substantially one-third the width of the conveyor chamber 10, and rotatably mounted therein adjacent a side 14, said side 14 being opposite the chamber 11. A plurality of ice cream receiving slats or blocks 15 are riveted or otherwise secured at 16, and in spaced relation, to the outer surface of the endless conveyor 13. The blocks 15 are equal in length to substantially the internal width of the chamber 10, said blocks 15 being secured at only one end to the endless conveyor belt to leave a portion 18 thereof projecting outwardly from the edge of conveyor belt 13, and which portion is adapted for receiving a body of ice cream to be separated into bricks.

The outer ends of the various blocks 15 are provided with roller attachments 19, for supporting the conveyor means B in suitable runways 20 and 21. The runways 20 and 21 are preferably in the form of oval shaped channels, the rollers 19 being disposed interiorly of the channels and bearing upon the lower flange. It is preferred that the track or runway 20 be disposed interiorly of the chamber 10, and upon the side 14, in unbroken arrangement to provide proper support of the various rollers 19 throughout their length of travel. The trackway 21 is somewhat different from the trackway 20, the same being disposed upon the side of the casing 10, upon which the chamber 11 is formed, it being preferred that the upper portion 25 of the trackway 21 be removed where the same is disposed adjacent the chamber 11, to provide a proper arrangement for the cutting means C and which will subsequently be described in detail. The outer ends of the upper and lower flanges comprising the runway 21 are outturned as at 26, to provide ready entrance of the rollers 19. The trackways 20 and 21 extend substantially the entire length of the casing A, thus providing an endless conveyor means to occupy the interior of said casing A throughout the length of the chamber 10.

As the upper part of the conveyor B travels past the chamber 11, it will be seen that the outer portions 18 of the blocks 15 would sag, if no means were provided to take the place of that section of the runway 21 which is removed. To supply this defect, suitable roller arrangements 30 have been provided adapted for engaging beneath the various blocks 15 immediately adjacent their outer ends. These roller arrangements are supported by bars 31 extending from the side 14 of chamber 10, to the extreme outer side 32 of chamber 11, and properly affixed to said sides in any preferred manner. The roller arrangement 30 preferably comprises a frame 33 provided with the flanges 34 adapted for rotatable reception of the relatively small rollers 35. The rollers 35 are so spaced with respect to each other, that when the various arrangements 30 are positioned upon the bars 31, a space 36 will occur between rollers 35 of adjacent devices 30. This space 36 is substantially equivalent to the various spaces 37 occurring between the blocks 15, said space likewise being provided for cooperation with the cutting means C, and which will subsequently be described.

The cutting means C is preferably rotative, including a shaft 40 rotatably mounted in a rectangular frame work 41, which is secured to opposite ends of the casing 11, in any preferred manner. The extending arms 42 and 43 are provided with an overhead brace 44, said upstanding arms 42 and 43, and overhead brace 44 preferably comprising the rectangular frame work 41. Blade retaining sockets 45 are detachably clamped in spaced relation upon the shaft 40, the spacing of said sockets 45 being arranged in alignment with the various spaces 37 as provided between adjacent blocks 15. The blade retaining means 45 are provided with diametrically opposite sockets 47 and 48 for detachable reception of suitable shanks upon the inner end of the cutting blades 49. In this arrangement, the blades 49 are diametrically opposed upon the retaining attachments 45, and in alignment with each other. Said blades are so arranged that the forward cutting edges 50 of each are spaced toward the conveyor B as the shaft 40 is rotated. The blades 49 are so positioned with respect to the conveyor B that as they are rotated by rotation of the shaft 40, the cutting portion of said blades 49 will be rotated to intersect the spaces 37 of the conveyor B, and which operation will effect a cutting of the body of ice cream which is carried by the conveyor belt on the projecting portions 18 of the various blocks 15. In normal inoperative position, one blade 49 is disposed upwardly over the shaft 40, while the opposite blade 49 is disposed downward in the chamber 11, as illustrated in Figure 3.

The means D for operating the rotative cutter C is adapted for manual operation. The same comprises a gear wheel 55 keyed to an end of the shaft 40 which projects outwardly from the arm 43; a second gear wheel 56 of approximately the same size as gear wheel 55, which is in mesh with said gear wheel 55 and rotatably disposed upon a stub shaft bearing in the arm 43; and a relatively large gear wheel 57 in the ratio of two to one to the gear wheels 55 and 56, the gear wheel 57 being rotatably disposed upon a stub shaft 58 bearing in the arm 43. An operating handle 59 is oscillatively disposed upon the stub shaft 58 and is provided with a pawl 61 pivotally mounted on said handle 59, and adapted for engagement with the teeth 62 upon the gear wheel 57. The operating handle 59 is only adapted for one quarter of a revolution, and to limit this arc, a stop 63 is riveted or otherwise secured upwardly upon the cross member 44 to define the extreme upward position of the handle 59; while a lower stop 64 is riveted or otherwise secured to the arm 43 and preferably at 90° with respect to the stop 63 whereby the handle 59 can be oscillated through an arc of 90°.

Since the gears 55, 56, and 57 are in mesh with each other, and due to the fact that the ratio of said gear is 2 to 1, it follows that upon rotation of the gear 57 upon its stub shaft 58, the shaft 40 will be oscillated through an arc of 180°. This oscillation of the handle 59 will have the effect of moving the various knives 49 which are positioned upwardly, down their respective faces 36 and 37 to assume the extreme lower position of the blades, thus having travelled through an arc of 180° with shaft 40.

In operating the device, a body of ice cream is placed upon the projecting portions 18 of the conveyor means B, and as the same is moved forwardly by the means G (which will be hereinafter more fully described) and upon oscillation of the rotary cutting means C, said ice cream will be severed into a plurality of blocks due to the cutting action of the upper blade 49. This handling of the ice cream will result in portions adhering to the blades 49, as well as adhering to the various blocks 15 of the conveyor means B.

To properly cleanse the blades 49, the improved means E has been provided and which includes the scraping means 67 and the wiping device 68. Each pair of blades 49 which are mounted upon the blade receiving member 45 is provided with devices 67 and 68, which are mounted upon a plate or floor 69, soldered or welded into horizontal position in the top of the chamber 11, substantially as illustrated in Figures 1 and 3 of the drawings. The floor 69 is provided with various slots 70 therein for free entrance and exit of the various blades 49 from the chamber 11. The scraping means 67 comprises a pair of rubber or fabric yieldable strips, which are positioned on the bottom of the floor 69 to meet at their longitudinal edges below a slot 70. The wiping means 68 each comprise a pair of triangularly shaped yieldable sections 71 abutting throughout the length of the slot 70 directly over said slot, and yieldably maintained in place by the resilient metal members 72, which are riveted or otherwise secured upon the top of the floor 69. Thus as a blade 49 is rotated by shaft 40 upwardly from the chamber 11, the same is first scraped of any residue ice cream clinging thereto by the abutting edges of the pliable sections comprising the scraping device 67; and as the knife is further rotated upwardly through the slot 70 in the floor 69, it will be drawn through the contacting surfaces of adjacent wipers 71, and due to the fact that said wipers are closely held together by the members 72, said blade will be wiped clean of any material or liquid adhering thereto.

It is preferred that some cleansing liquid, such as water, be disposed in the casing A to a height just short of the floor 69, whereby upon rotation of the conveyor means B, the lower portion of said conveyor will be drawn through said liquid or water for properly cleansing the same from any residue material adhering thereto. In like manner, the knives 49 as they are drawn through the chamber 11 will be swashed through the liquid in the casing A and preliminarily cleansed.

The conveyor wiper F preferably comprises a piece of pliable material 75, such as rubber, or fabric, which is rigidly attached as by a structure 76 to the end 77 of casing A. The forward end of the pliable strip 75 projects from the casing 76 and contacts with the top surfaces of various blocks 15 as the conveyor arrangement B is rotated, thus effectively wiping said top surfaces, which ordinarily come into contact with the ice cream.

The spacing means G which is adapted to properly move the conveyor B in cutting relation with the means C, includes a bar 78 mounted upwardly of the casing A and upon the side 14 thereof as by supporting brackets 79. A substantially L-shaped operating lever 80 is provided for reciprocation upon the rod 78, the same having a suitable aperture therein for such purpose. It is preferred that the lever 80 include a handle 81, and an outwardly extending arm 82, which projects over the belt arrangement 13 of the conveyor. The lever 80 is adapted for rocking upon the shaft 78, as well as for reciprocation, and the arm 82 thereof is provided with an extension 83 projecting downwardly toward the conveyor means B, said extension 83 adapted to project into the various spaces 37 of adjacent blocks 15 when in its downmost position, the lower edge of said extension 83 when in this position preferably resting upon the brass conveying belt 13. The brackets 79 are accurately spaced, whereby upon disposition of the extension 83 in a space 37, said lever arrangement 80 being in contact with the bracket 79 toward the feeding end of the container A, and upon forward movement of the handle 80 by reciprocation over the rod 78, the same will move the conveyor B by contact of the extension 83 with one of the blocks 15, and when the handle 80 has reached its most forward position as defined by a bracket 79 adjacent the exit end of the casing A, the conveyor B will have been moved in proper position for operation of the cutting means C.

The brick receiving arrangement H preferably comprises a table 90 which may be secured in any approved manner to the rear end of the casing A and preferably a short distance between the upper surface of the blocks 15, as illustrated in Figure 2 of the drawings. A pair of forward brick engaging projections 92 are provided to overlie the portions 18 of the various blocks 15 as they are rotated, and the forward ends of which projections 92 are bevelled to scrape the ice cream bricks from the conveyor B as the same is rotated, and for disposition on the table 90.

In actual operation of the device, a unit body of ice cream is disposed upon the conveyor B in such manner that the forward end of said body will lie about flush with the forward end of the extension 11. The operator next moves the shifting arrangement G to contact with the forward bracket 79 substantially as above described, and in moving the conveyor forward, the body of ice cream will be conveyed toward the exit end of the conveyor B, and into position to be operated on by the cutting means D.

Upon rotation of the shaft 40 in the manner above described, the upper knife 49 will slice downwardly through the body of ice cream, passing through the various spaces 36 as defined by adjacent blocks 15, thus cutting the body of ice cream on the conveyor into a plurality of bricks of even and exact proportions. Upon duplication of the above operation, the bricks which have been cut will be scraped up by the projections 92 upon the receiving shaft 90, and a rear portion of uncut ice cream will be again disposed to be operated upon by the cutting means C.

A drain device 95 is preferably provided upon the bottom of the casing A adjacent its feeding end 77 for the purpose of draining liquid from said casing.

From the foregoing description, it can be seen that a device has been perfected in which the cutting means and the conveyor arrangement cooperate to exactly cut a body of material, such as ice cream into bricks; and which arrangement likewise provides sanitary features, in that the liquid contained in the casing A will wash the blades 49 and the blocks 15 of the conveyor B, the liquid for washing said blades and blocks being scraped therefrom by the improved devices above described.

Various changes in the shape, size and arrangement of parts may be made to the form of my invention herein shown and described, without departing from the spirit of the invention or the scope of the claims.

I claim:

1. A cutting machine comprising a rotary conveyor having spaced slots therein extending inwardly from one marginal edge thereof, means for supporting said conveyor adjacent said slots and leaving the same unobstructed, rotary cutting means disposed adjacent the edge of said conveyor in which said slots are formed, and means for effecting a movement of the cutting means in order that the same may intersect entirely through the slots therein for slicing material disposed upon said conveyor.

2. An ice cream brick cutting machine, comprising in combination a casing adapted to contain a cleansing liquid, a conveyor for carrying bodies of ice cream, and cutting means for sub-dividing said bodies of ice cream into bricks, said conveyor and cutting means adapted to enter the liquid in said casing for cleansing purposes.

3. An ice cream brick cutting machine, comprising in combination a casing for containing a cleansing liquid, conveying means rotatably carried by said casing, cutter means in said casing, said conveyor and cutter means adapted for entering said cleansing liquid after contact with ice cream for cleansing the same, and wiping means for drying said conveyor and cutting means.

4. An ice cream brick cutting machine, comprising in combination a conveyor, spacing means for manually advancing said conveyor a predetermined distance, and cutter means adapted for intersection through said conveyor for sub-dividing ice cream upon said conveyor.

5. An ice cream brick cutting machine, comprising in combination, a conveyor, a plurality of supporting blocks carried by said conveyor, a portion of each of said blocks projecting outwardly from said conveyor for supporting a body of ice cream, and cutting means for intersecting action with said projecting portions of the blocks to sub-divide a body of ice cream thereon into a plurality of ice cream bricks.

6. An ice cream brick cutting machine, comprising in combination a casing, a conveyor rotatably disposed in said casing, rotary cutting blades for coaction upon said conveyor to sever ice cream bodies thereon into bricks, means for operating said cutter blades in proper relation to said conveyor, means for washing said conveyor and cutter blades, means for wiping said conveyor and cutter blades, spacing means for moving said conveyor to proper position, and means for receiving ice cream bricks from said conveyor.

7. An ice cream brick cutting machine, comprising in combination a supporting casing, conveyor means in said casing including a belt and a plurality of blocks, each of said blocks supported at one end upon said conveyor belt and provided with a projecting end for supporting ice cream bodies, cutter means for coaction with said projecting block ends to slice ice cream thereon into brick formation, and means for supporting the projecting ends of said blocks both during rotary movement on the belt, and during the brick cutting operation.

8. An ice cream brick cutting machine, comprising in combination a conveyor, cutting means for co-action with said conveyor to slice bodies of ice cream upon said conveyor into brick formation, a pair of stationary supports, a bar carried by said stationary supports, and a manually operated rocking lever reciprocably disposed upon said bar for coaction between said stationary supports to move said conveyor a predetermined position with respect to said cutter means.

9. In a cutting machine, the combination of a casing, cutting means mounted adjacent one side of said casing, an endless track disposed upon one side of said casing opposite said cutting means, a second track disposed upon a side of said casing adjacent said cutting means, and having an upper portion of said track removed for action of said cutting means, a conveyor belt, spaced supporting blocks mounted upon said belt for rotation therewith, rollers upon the ends of said blocks, and for disposition within the tracks in said casing to support said conveyor belt and blocks in endless rotation in said casing, and roller means for supporting said blocks adjacent the removed upper section of said track, for coaction with said cutter means to permit cutting of bodies upon said conveyor, and at the same time for supporting said conveyor during rotation.

10. An ice cream brick cutting machine, comprising in combination a casing adapted for containing cleansing liquids, a conveyor rotatably mounted in said casing for containing plastic bodies, cutting means operatively mounted adjacent said conveyor for slicing bodies placed upon said conveyor into brick formation, said cutting means adapted for swashing through said cleansing liquid after a cutting operation for primarily cleansing the same, a flexible scraping device mounted upon said casing for removing residue plastic material adhering to said cutting blades, and flexible wiping means resiliently disposed upon said casing for wiping and drying said blades for a succeeding operation.

11. A cutting machine of the class described comprising a movable endless belt conveyor having slots transversely therethrough, and cutting means for transverse action through the slots of said belt conveyor whereby to subdivide bodies upon said conveyor as they are moved into the intersecting action of said cutting means.

JOSEPH PABRECK HOGELUCHT.